United States Patent [19]
Chi

[11] Patent Number: 4,783,091
[45] Date of Patent: Nov. 8, 1988

[54] APPARATUS FOR EXERCISE AND RECREATION

[76] Inventor: Hong Chi, WuHan Hydraulic/Electric Power Int., c/o Faculty's Residence, No. 5-7, WuHan, China

[21] Appl. No.: 50,306

[22] Filed: May 14, 1987

[30] Foreign Application Priority Data

Dec. 30, 1986 [CN] China ................................. 86210936

[51] Int. Cl.$^4$ ............................................. B62M 1/00
[52] U.S. Cl. ..................................... 280/218; 280/221; 280/225; 280/242 R
[58] Field of Search ............... 280/220, 221, 225, 226, 280/242 R, 218, 1.181, 12.1, 3

[56] References Cited

U.S. PATENT DOCUMENTS

| 887,812 | 5/1908 | Johnson | 280/220 |
| 1,607,972 | 11/1926 | Wagner | 280/12.1 X |
| 4,076,269 | 2/1978 | Muguruma | 280/242 R |
| 4,200,307 | 4/1980 | Hwang | 280/218 |

FOREIGN PATENT DOCUMENTS

| 2253073 | 10/1972 | Fed. Rep. of Germany | 280/218 |
| 1052793 | 1/1954 | France | 280/221 |
| 1604404 | 12/1981 | United Kingdom | 280/220 |

Primary Examiner—John A. Pekar
Attorney, Agent, or Firm—Michael N. Meller

[57] ABSTRACT

An apparatus called the "disco-car" is used for both exercise and recreation and comprises an exercising board, a direction-control mechanism and a wheel system. The disco-car does not need any driving power and can start to run at the player's will so long as the player stands on the exercising board and swings or sways his (or her) body together with hand control of the direction. A maximum speed of 11 km/h can be reached. The disco-car is easily operated and safe, and thus is suitable not only for the young and old but also for handicapped people.

6 Claims, 6 Drawing Sheets

E−E

A—A

APPARATUS FOR EXERCISE AND RECREATION

BACKGROUND OF THE INVENTION (A) Field of the Invention

The present invention relates to an apparatus for exercise and recreation, and more particularly to an apparatus for both exercise and recreation which moves forward by swinging or swaying of the player's body.

(B) Description of Prior Art

The known apparatuses of this general type for both exercise and recreation are roller skates and roller boards. Although neither a power nor any special mechanism is needed in roller skating, it requires that the player's feet step on the ground in turn and that the player have good skill of balance, consequently it is not suitable for use by old and handicapped people. As for the roller board, it can only move forward by the player's one foot stepping on the ground. Even though it can also move forward by swinging of the player's body, this sort of skill can only be mastered after a long period of training and practice, and it is still difficult to control the direction. This sort of roller board is generally played on a bowl-shaped surface with lip-diameter larger than six meters by making use of the principle of transformation between kinetic and potential energy to make it move up and down. Thus its application is quite limited.

OBJECT OF THE INVENTION

The object of the present invention is to provide a novel apparatus hereinafter called "disco-car for both exercise and recreation, which apparatus does not have the above-mentioned disadvantages of the prior art. The apparatus of the present invention is driven forward by swinging or swaying of the player's body together with hand control of the direction. Playing disco-car will be an easy, safe and enjoyable sport and will be a joyful entertainment for every player.

SUMMARY OF THE INVENTION

The present invention is a disco-car for both exercise and recreation which moves forward by swinging or swaying of the player's body together with hand control of the direction. The disco-car comprises at least two rows of wheels, an exercising board supported on them and a control mechanism controlling the direction of at least one row of the wheels. The disco-car of the present invention may have one or two control levers. In the preferred embodiments the car is equipped with at least one row of direction-controllable wheels which has at least two wheels attached at each end of the axle, respectively.

As for the disco-car with two control levers, its two direction-controllable wheels are respectively mounted on a semi-axle, and can change their direction simultaneously by means of a connecting bar of the control mechanism. The two control levers can be pushed forward and pulled backward, which levers are linked to always move in opposite directions to each other. The rear wheels can change their direction jointly with the front ones but in the opposite direction if it is necessary. Moreover, a rocking chair can be mounted on the above-mentioned exercising board.

As for the disco-car with one control lever, its front wheels are mounted on a frame which, by means of the control lever, swivels about a pivot shaft.

BRIEF DESCRIPTION OF DRAWINGS

Four embodiments of the present invention will be described in detail with reference to the attached figures, in which.

DETAILED DESCRIPTION OF THE INVENTION

FIGS. 1 to 5 show the first embodiment of the present invention.

A board 1 is made of plastic or metal sheet. Near the edges of the board, there are two concavities 6 which are for the player to stand on.

Figure 1A:
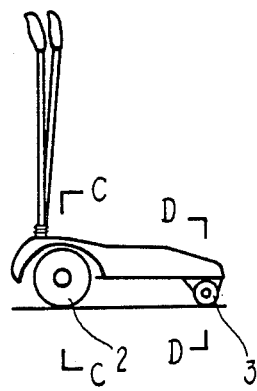
FIG. 1 is a configuration sketch of the first embodiment of the present invention, where 1A is the side view, 1B is the front view and 1C the top view.
Figure 1B:
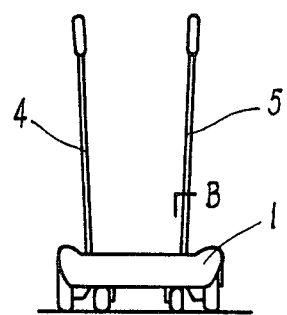
Figure 1C:
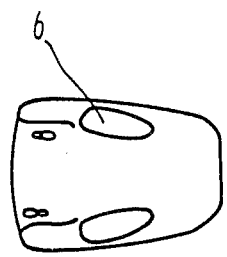
Figure 2:
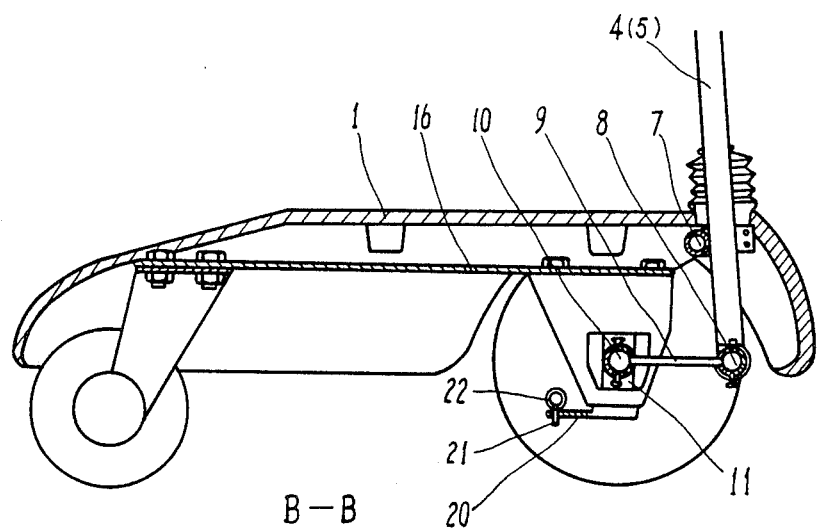
FIG. 2 is a cross section of the present invention taken along line B—B in FIG. 1.

The direction-control mechanism comprises two control levers 4 and 5, pin 7, universal joints 8 and 10 and connecting bar 9 as shown in FIG. 2. The control levers can swing about pin 7, while the bottom end of the lever is connected to a universal joint 8, which, in sequence, is connected to universal joint 10 through a connecting bar 9.

Figure 4:
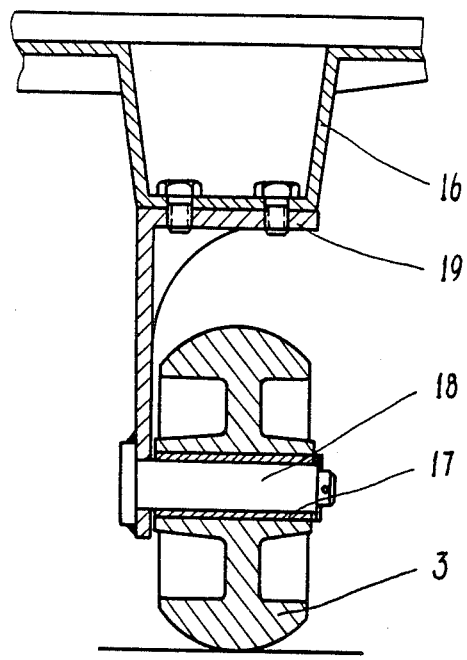
FIG. 4 is a partial cross section taken along line D—D in FIG. 1, showing the structure of a rear wheel.
Figure 5:
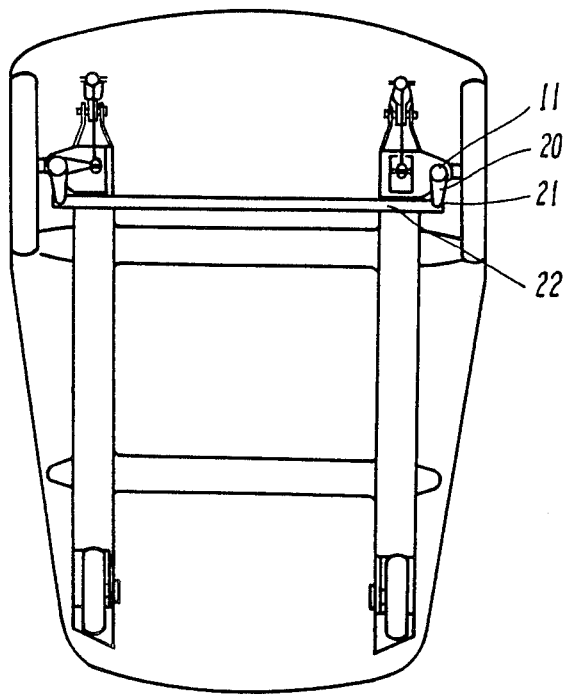
FIG. 5 is bottom view of the first embodiment of the present invention.

The wheel system comprises front wheels 2, rear wheels 3, bar 12, vertical shaft 11 of the front wheel, support 13, semi-axle 14, bearing 15, frame 16 (refer to FIG. 3), bearing 17, rear semi-axle 18, rear frame 19 (refer to FIG. 4), bolt 21 and linking bar 22 (refer to FIG. 5).

Figure 3:
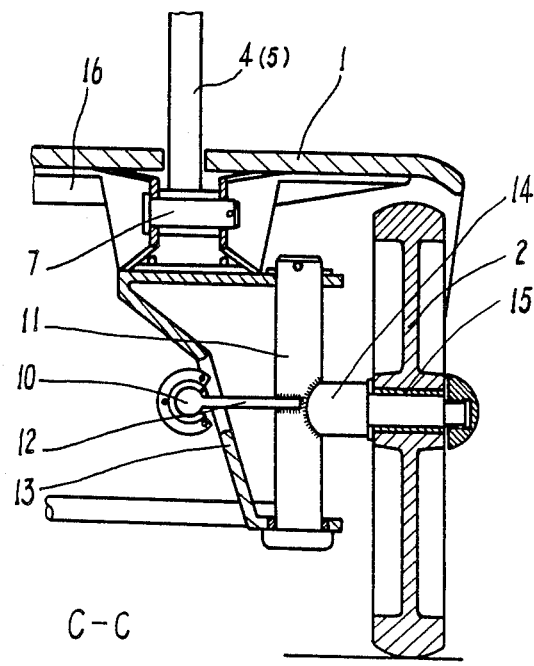
FIG. 3 is a partial cross section taken along line C—C in FIG. 1, showing the structure of the front wheel.

Referring to FIG. 3, the vertical shaft 11 of the front wheel is rotatablely mounted on support 13 and connected with universal joint 10 of the direction-control mechanism by a bar 12, in parallel to which a semi-axle 14 is welded to the vertical shaft 11 of the front wheel. The front wheel 2 is rotatably mounted on the semi-axle 14 through a bearing 15. The support 13 is fixed on a frame 16 which is made of metal sheet or other material and formed by pressing. Frame 16 is the main load-bearing structure on which exercising board 1 is attached, although frame 16 and exercising board 1 can also be formed integrally.

In FIG. 4, rear wheel 3 is rotatably mounted on a rear support 19 through a bearing 17 and a rear semi-axle 18. Rear support 19 is fixed on frame 16.

Linking bar 20 in FIG. 5 is fixed on the bottom end of vertical shaft 11 of the front wheel and swivels integrally with shaft 11. The linking bar 20 is substantially perpendicular to bar 12 and semi-axle 14. The component that enables the two front wheels to change their direction synchronously is a connecting linking bar 22 which is hinged to linking bar 20 by bolt 21. The process of synchronously changing direction is as follows:

When standing on the board 1 with two feet respectively in concavities 6 and two hands holding control levers 4 and 5, the player pulls either one of the two control levers backward, the swing of the bottom end of the pulled control lever will cause connecting bar 9 to move forward via universal joint 8, and the universal joint 10 at the other end of connecting bar 9 will also allow bar 12 to move forward. This will make vertical shaft 11 of the front wheel rotate in support 13, and semi-axle 14 on vertical axle 11 will rotate about shaft 11 accordingly. The front wheel will turn about vertical shaft 11 and its direction will be changed. At the same time, linking bar 20 at the bottom end of vertical shaft 11 will push linking bar 22 to move via bolt 21, and this will cause the other front wheel to turn, causing the two front wheels to turn synchronously in the same direction. The other control lever in the other hand will automatically move forward.

If at the moment when the left control lever is pulled backward and the right control lever is pushed forward, causing the front wheels to begin to turn left, the center of gravity of the player's body is also swung to the left, then a component force resulting from the inertial force of swinging of the player's body will push the disco-car forward in the front wheel's turning direction. On the other hand, if the player's body is swung to the right when the front wheels are turning left, the inertial force of swinging of the player's body will cause the disco-car to move backward. Similarly, if the player's body swings to the right when the front wheels are turning right, the inertial force of swinging of the player's body will push the disco-car forward, whereas if the player's body swings to the left, the disco-car will move backward. When the player repeats these swings consecutively and harmoniously, the disco-car will gather speed to move forward. The movement of the player when operating said disco-car is very much like said basic movement of modern disco dancing. This is why the apparatus of the present invention is termed a disco-car. Operating this apparatus will be of benefit to the fitness of the waist and legs of the player. Therefore it can best realize the two arms of entertainment and exercise.

Figure 6:
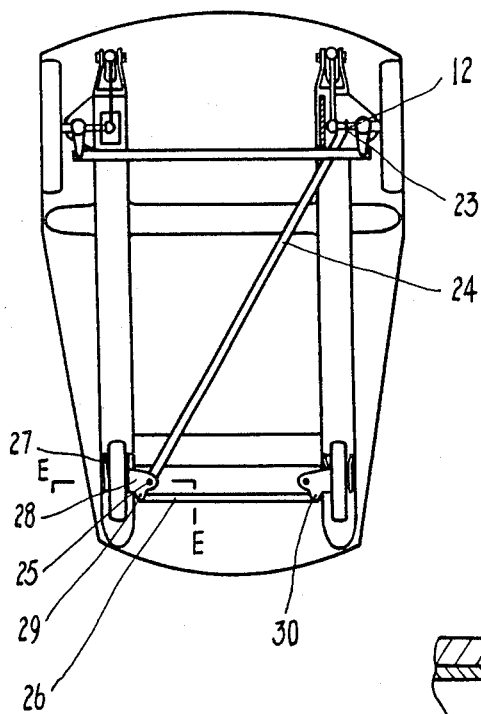
FIG. 6 is a bottom view of the second embodiment of the present invention.
Figure 7:
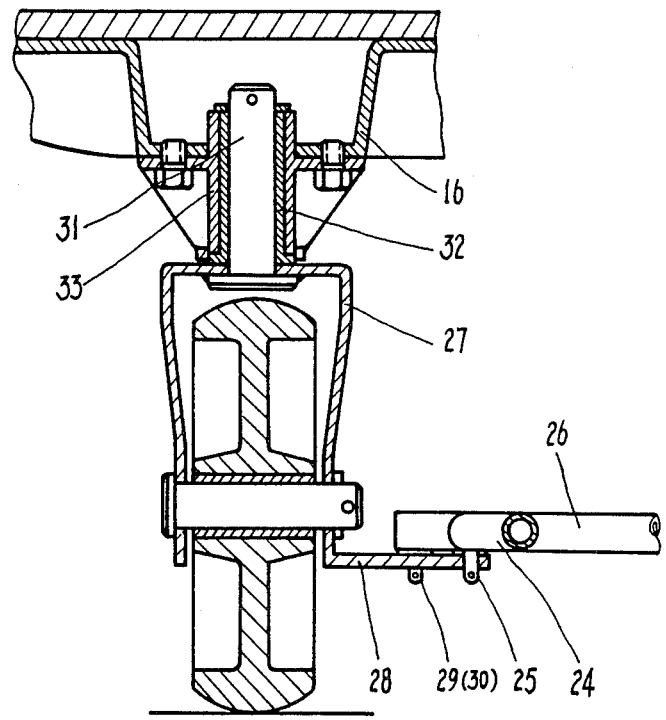
FIG. 7 is a cross section taken along line E—E in FIG. 6, showing the structure of a rear wheel.

FIGS. 6 and 7 show the second embodiment of the present invention.

This type of disco-car is provided for enabling two persons to play together. Although the first embodiment can also be operated by two persons, the second one is more attractive and interesting for two players. Compared with the first embodiment, the second embodiment has a lengthened board, additional vertical shafts 31 which enable the rear wheels 3 to change their direction, and a linking structure connecting the direction control of the front and rear wheels as shown in FIG. 6. A long connecting rod 24 is hinged on the bar 12 of the front wheel by bolt 23. The other end of the connecting rod 24 is hinged by bolt 25 on bar 28, and with the latter is structured integrally with wheel seat 27 of the rear wheel. Two bars 28 of the rear wheels are connected by connecting bar 26, whose two ends are hinged on bars 28 by bolts 29 and 30. This makes the two rear wheels change their direction synchronously.

In FIG. 7, a vertical shaft 31 of the rear wheel is rotatably mounted on frame 16 through a bearing 32 and a housing 33. The vertical shaft 31 is welded to wheel seat 27, with which bar 28 is structured integrally. The operation is as follows:

When front wheels 2 turn to in a certain direction under the operation of the control levers 4 and 5, the swivel of bar 12 causes rear wheel 3 to turn about the vertical shaft 31 by means of long connecting bar 24 and bar 28 of the rear wheel. The connecting bar 26 makes both rear wheels turn in the same direction. According to the above-mentioned connection arrangement shown in FIG. 7, when the front wheels turn to the left, the rear wheels will turn to the right; when the front wheels turn to the right, the rear wheels will turn to the left.

The operating method of this embodiment is as follows:

Two players stand on the board, one behind the other. The front player controls the moving direction of the disco-car, while the back player holds the shoulders or the waist of his (or her) partner. If the front player swings his (or her) body to the left while making the disco-car turn to the left, the back player must swing to the right, and vice versa.

Figure 8:
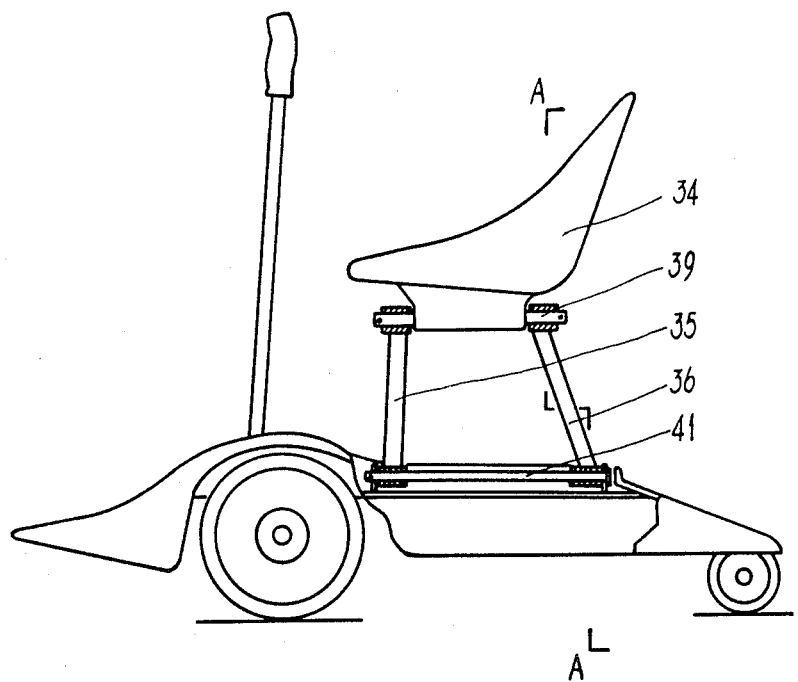
FIG. 8 is a side view of the third embodiment of the present invention.
Figure 9:
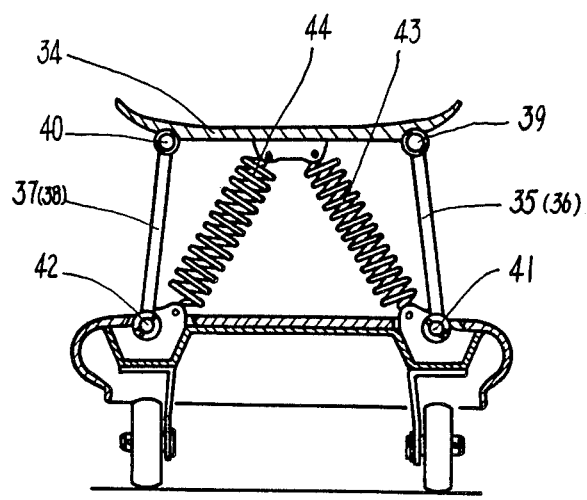
FIG. 9 is a cross section taken along line A—A in FIG. 8, showing the structure of the rocking chair.

FIGS. 8 and 9 show the third embodiment of the present invention. The player can sit on the disco-car while operating it. The direction-control mechanism and wheel system are the same as in the first embodiment. The only difference is that a rocking chair 34 is mounted on the board. To mount the chair, both ends of linking bars 35, 36, 37 and 38 are respectively hinged on shafts 39, 40 under the chair and shafts 41 and 42 on frame 16. Shafts 39, 40, 41 and 42 are substantially parallel to the moving direction of the disco-car 16. Two springs 43 and 44 are utilized to restore the chair to its basic position. As the arrangement shows, chair 34 can only move transversely. The operating method is basically the same as in the first embodiment. The difference is that when the sitting player pulls the left control lever backward with his (or her) left hand, his (or her) body will tilt to the left by a pulling force. The chair, therefore, will also tilt to the left, and vice versa. The center of gravity of the player's body then swings. Based on the same principle of dynamics as described in connection with the first embodiment, the disco-car will also gather speed to move forward. This provides a safe and recreational apparatus for old and handicapped people.

Figure 10:
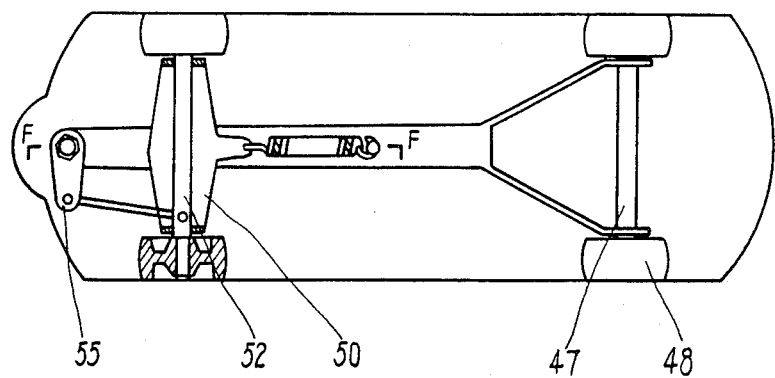
FIG. 10 is a bottom view of the fourth embodiment of the present invention.
Figure 11:
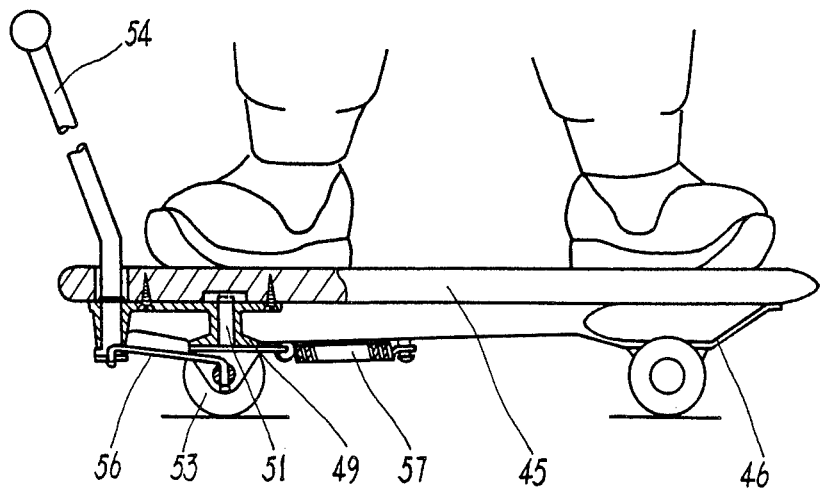
FIG. 11 is a partial cross section taken along line F—F in FIG. 10.

FIGS. 10 and 11 show the fourth embodiment of the present invention, in which one control lever 54 is utilized to control the direction of the front wheels 53. Adjacent to the rear end of the board 45 is the fixed rear frame 46 on which a fixed axle 47 with two rear wheels 48 is mounted. At the front of board 45, a front axle 52 with front wheels 53 is mounted in a front frame 50, which in turn is rotatably mounted in a bearing housing 49 through a vertical shaft 51. Thus the front wheels 53 not only can rotate freely about front axle 52, but also can swivel in the bearing housing 49 about shaft 51 to change their direction. The turning of front frame 50 is performed by operation of control lever 54 through swivel arm 55 and linking bar 56. Spring 57 is used for restoring front frame 50 to it initial position. Its one end is fixed on the body of the disco-car, another end is connected with front frame 50. FIG. 11 also shows the way of standing on board 45.

The operating method of this embodiment is as follows:

The player should stand on the board as shown in FIG. 11, i.e. with his (or her) two feet at the front and rear side of board 45, respectively. Preferably, the center of gravity of his (or her) body falls on the position near his (or her) foot at the rear side, while the player holds control lever 54 with one hand and sways his (or her) body clockwise and counter-clockwise about his (or her) body's vertical axis. That is, when swaying clockwise, the player rotates control lever 54 clockwise, and vice versa.

In summary, the present invention provides an apparatus for both exercise and recreation. No special requirement is needed for the playground. Thus, it has a wide range of application. Since the player's waist and legs must continuously swing or sway, as do the hands, the disco-car in accordance with the invention therefore can reach the dual aims of exercise and recreation. The fourth embodiment of the present invention requires not only better sport technique but also certain physical strength. It is more attractive to young people.

It should be noted that the present invention can be further improved, such as the length of the control lever can be adjusted in accordance with the individual player, a brake device may be provided, and only one front wheel is necessary. These improvements are all within the the present invention.

I claim:

1. An apparatus for use in exercise and recreation whereby movement in a forward direction is produced by swinging or swaying of the player's body together with steering by hand, comprising first and second rows of wheels, a board supported on said wheels and a direction-control means for controlling the direction of said first row of wheels, wherein said first row of wheels comprises a first left wheel and a first right wheel which change their direction synchronously by means of a first connecting bar, wherein said second row of wheels are also direction-controllable for synchronously changing direction with the first row of wheels but in the opposite direction by means of a connecting rod operatively coupled to said direction-control means, and wherein said second row of wheels comprises a second left wheel and a second right wheel which change their direction synchronously by means of a second connecting bar.

2. An apparatus for use in exercise and recreation whereby movement in a forward direction is produced by swinging or swaying of the player's body together with steering by hand, comprising:
   a frame with a board for loading of the player;
   a front row of wheels having a front left wheel and a front right wheel, each of the wheels being pivotable about a respective vertical shaft, said vertical shafts being supported by said frame;
   a front linking bar for enabling said front wheels to change their directions synchronously;
   a rear row of wheels having a rear left wheel and a rear right wheel, each of the wheels being pivotable about a respective shaft, said vertical shafts being supported by said frame;
   a rear linking bar for enabling said rear wheels to change their directions synchronously;
   a connecting rod hinged at its one end with said front linking bar and at its other end with said rear linking bar in such a manner that the turning direction of the front row of wheels is opposite to the turning direction of said rear row of wheels; and
   a direction control means for controlling the direction of the wheels, wherein said direction control means comprises two control levers pivotably mounted on said frame about pins, each of the lower ends of said levers being connected to one of said vertical shafts through a connecting bar.

3. An apparatus as defined in claim 2, wherein said two control levers are pivotably mounted for swinging in substantially forward and rearward directions and are operatively coupled to swing in opposite directions to each other.

4. An apparatus for use in exercise and recreation whereby movement in a forward direction is produced by swinging or swaying of the player's body together with steering by hand, comprising;
   a frame with a board for loading of the player;
   a front row of wheels having a front left wheel and a front right wheel, each of the wheels being pivotable about a respective vertical shaft, said vertical shafts being supported by said frame;
   a rear row of wheels having a rear left wheel and a rear right wheel, said wheels being mounted on said frame with the wheels only permitted to rotate freely about their own axes;
   a direction control means for controlling the direction of said front row of wheels, wherein said direction control means comprises two control levers pivotably mounted on said frame about pins, each of the lower ends of the levers being connected to one of said vertical shafts through a connecting bar; and
   a linking bar for enabling said front wheels to change their directions synchronously.

5. An apparatus as defined in claim 4, wherein said two control levers are pivotably mounted for swinging in substantially forward and backward directions and are operatively coupled to swing in opposite directions to each other.

6. An apparatus as defined in claim 5, wherein a rocking chair is mounted on said board through linking bars, and two springs are utilized to restore the chair to its basic position such that said chair can only move transversely.

* * * * *